United States Patent
Berke et al.

(10) Patent No.: US 9,230,137 B2
(45) Date of Patent: Jan. 5, 2016

(54) SECURE ORIGINAL EQUIPMENT MANUFACTURER (OEM) IDENTIFIER FOR OEM DEVICES

(71) Applicant: Dell Products L.P., Round Rock, TX (US)

(72) Inventors: Stuart Allen Berke, Austin, TX (US); Mukund Purshottam Khatri, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 57 days.

(21) Appl. No.: 13/905,209

(22) Filed: May 30, 2013

(65) Prior Publication Data

US 2014/0359303 A1 Dec. 4, 2014

(51) Int. Cl.
*G06F 21/73* (2013.01)
*G06F 21/57* (2013.01)

(52) U.S. Cl.
CPC .............. *G06F 21/73* (2013.01); *G06F 21/572* (2013.01); *G06F 2221/2107* (2013.01)

(58) Field of Classification Search
CPC ............................... G06F 21/73; G06F 21/572
USPC ......................................................... 713/189
See application file for complete search history.

(56) References Cited

U.S. PATENT DOCUMENTS

| 5,774,544 A * | 6/1998 | Lee et al. ....................... 713/189 |
|---|---|---|
| 6,112,246 A * | 8/2000 | Horbal et al. ................. 709/230 |
| 6,549,972 B1 * | 4/2003 | Berstis et al. ................. 710/311 |
| 7,660,998 B2 * | 2/2010 | Walmsley ....................... 713/189 |
| 8,559,287 B1 * | 10/2013 | Foland et al. ............... 369/53.26 |
| 2003/0065927 A1 * | 4/2003 | Penner ........................... 713/189 |
| 2004/0174570 A1 * | 9/2004 | Plunkett et al. .............. 358/3.13 |
| 2006/0047892 A1 * | 3/2006 | Lin et al. ....................... 711/105 |
| 2007/0180270 A1 * | 8/2007 | Kumagai et al. .............. 713/193 |
| 2008/0005586 A1 * | 1/2008 | Munguia ........................ 713/189 |
| 2008/0098380 A1 * | 4/2008 | Klusmeyer ..................... 717/168 |
| 2009/0217054 A1 * | 8/2009 | Haider et al. ................. 713/189 |
| 2009/0319802 A1 * | 12/2009 | Walmsley ....................... 713/189 |
| 2012/0079279 A1 * | 3/2012 | Leclercq ....................... 713/187 |
| 2012/0311249 A1 * | 12/2012 | Koya ............................. 711/105 |
| 2013/0185552 A1 * | 7/2013 | Steer ............................. 713/156 |
| 2014/0157000 A1 * | 6/2014 | Buer et al. .................... 713/189 |
| 2014/0164785 A1 * | 6/2014 | Ochiai et al. ................. 713/189 |

* cited by examiner

*Primary Examiner* — Harunur Rashid
*Assistant Examiner* — Shahriar Zarrineh
(74) *Attorney, Agent, or Firm* — Isidore PLLC

(57) ABSTRACT

An authorized information handling system (IHS) generates unique identifier codes for an OEM (programmable) device designed as a component for an IHS. An identifier generation and validation (IGV) controller in the authorized IHS generates a unique encrypted sequence by encrypting identification (ID) data read from the OEM device. The IGV controller generates a unique OEM identifier code by further encrypting the encrypted sequence using a first OEM proprietary code. The IGV controller writes the first identifier code to a prespecified storage location of the OEM device. According to one embodiment, the IGV controller generates the unique OEM identifier code using a second reversible encryption-decryption component that comprises an Exclusive-OR (XOR) scrambler engine and generates the unique encrypted sequence using a first reversible encryption-decryption component that comprises an LFSR based scrambler, which utilizes polynomial coefficients that are securely generated and maintained.

12 Claims, 10 Drawing Sheets

SECURE ORIGINAL EQUIPMENT MANUFACTURER (OEM) IDENTIFIER FOR OEM DEVICES

RELATED APPLICATIONS

The present application is related to co-pending, commonly assigned application Ser. No. 13/905,227, filed on the same date and having the same inventorship herewith. All content of the related application is incorporated herein by reference.

BACKGROUND

1. Technical Field

The present disclosure generally relates to information handling systems (IHS) and in particular to component validation within information handling systems.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer system developers spend an enormous amount of time and money developing, testing and validating commodities such as dual in-line memory modules (DIMMs) in their platforms in order to ensure compatibility and robustness of operation. However, in order to reduce costs, some customers choose to install commodities which are not validated by an original equipment manufacturer (OEM). These non-supported components may cause system instabilities, or lack the robustness required for OEM enhanced capabilities. These non-supported components also negatively impact product operational margin and increase system warranty costs.

As OEMs drive to offer differentiated capabilities, some depend on operating characteristics that are superior to the industry standard allowed range. An example is running a double data rate (DDR) channel frequency at "faster than standard" speed or "above industry standard validated" speed for a given topology and DIMM population, which is possible only with rigorous testing and validation of officially supported OEM validated DIMMs. As OEMs push the limits of frequency, it will be become critical to be able to determine if the installed DIMMs are truly OEM validated.

An easily identified or reverse engineered identification (ID) string is not sufficient to provide adequate security. Safeguards are required to prevent third parties from producing illegitimate DIMMs that appear to be OEM supported. Furthermore, DDR4 DIMM Electrically Erasable Programmable Read-Only Memory (EEPROM) serial presence detects (SPDs) no longer offer a permanent write protection mechanism found on prior generations of SPD EEPROMs, that was able to permanently lock the Joint Electron Device Engineering Council (JEDEC) standard contents of the SPD (DDR3 bytes 0-127). In addition, reversible software write protecting SPD content blocks requires serial address 0 (SA0) signal to be driven to a high level input voltage ($V_{HV}$) (e.g., approximately 7-10 volts) which can only be accommodated in a programming fixture. Lack of permanently locking the JEDEC standard bytes, and need to keep the OEM area unlocked, leaves the DIMMs open to manipulation.

BRIEF SUMMARY

Disclosed are a method and an information handling system (IHS) for securely generating unique identifier codes for an original equipment manufacturer (OEM) programmable device for use as a component within an information handling system. According to a first aspect of the disclosure, an identifier generation and validation (IGV) controller operating in an authorized HIS, such as within a secure manufacturing environment, encrypts first identification (ID) data from the programmable device using a first reversible encryption-decryption component to generate a unique encrypted sequence. The IGV controller then generates a first unique identifier code for the programmable device using a second reversible encryption-decryption component, which performs a second encryption using (a) an original equipment manufacturer (OEM) proprietary code and (b) the unique encrypted sequence. The IGV controller writes the first unique identifier code to a pre-specified location of the programmable device.

According to a second aspect of the disclosure, an information handling system (IHS) includes: at least one processor; a first encryption-decryption component; a second encryption-decryption component; and an identifier generation and validation (IGV) controller electronically coupled to at least one OEM programmable device and which: generates a unique encrypted sequence by performing a first encryption on identification (ID) data read from the OEM programmable device; generates a unique OEM identifier code for the OEM programmable device by performing a second encryption on the unique encrypted sequence using an OEM proprietary code; and writes the unique OEM identifier code to a pre-specified storage location of the OEM programmable device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
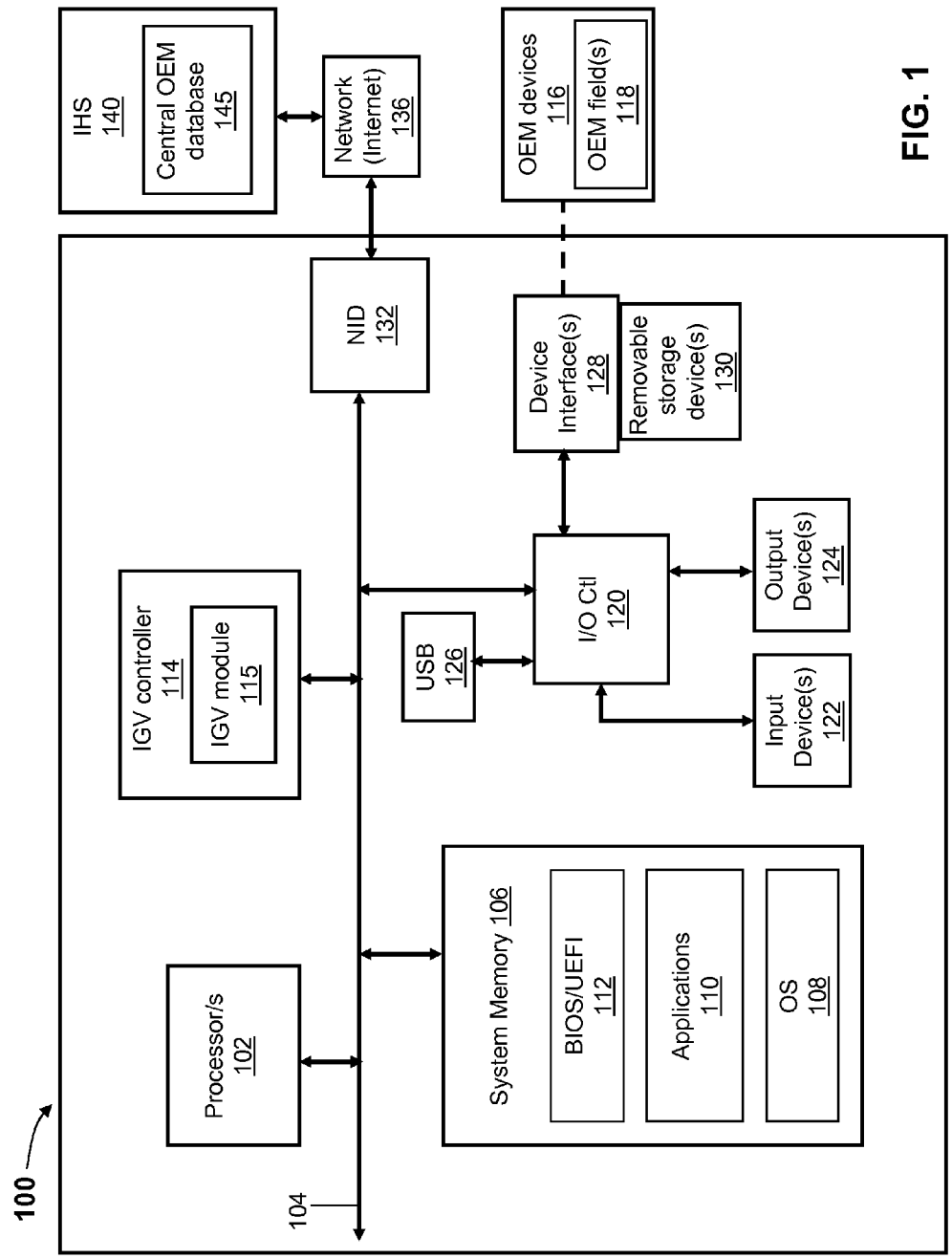
FIG. 1 illustrates an example information handling system (IHS) within which various aspects of the disclosure can be implemented, according to one or more embodiments.

The illustrative embodiments provide methods and information handling systems (IHS) that securely generate and validate unique identifier codes for an OEM original equipment manufacturer (OEM) (programmable) device. The illustrative embodiments further provide methods and information handling systems configured for validating an installed component using a securely generated unique identifier code associated with identifier data of the installed component. According to one embodiment of the unique identifier code generation, an identifier generation and validation (IGV) controller operating in an authorized IHS generates a unique encrypted sequence by encrypting identification (ID) data read from the OEM device. The IGV controller generates a unique OEM identifier code for the OEM device by further encrypting the encrypted sequence using a first OEM proprietary code. The IGV controller writes the first identifier code to a pre-specified storage location of the device. According to one embodiment of the unique identifier code validation, a locally-installed IGV controller performs a validation check on a target device by utilizing a decryption process yielding a component validation code and which reverses an associated encryption process for generating a unique OEM identifier code. The IGV controller identifies the target device as an OEM validated device if the component validation code matches a second OEM proprietary code corresponding to the target device.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. As shown, system memory 106 can include therein a plurality of modules, including operating system (OS) 108. In addition, system memory 106 includes Basic Input/Output System (BIOS) and/or a Unified Extensible Firmware Interface (UEFI), collectively represented as BIOS/UEFI 112, Applications 110 and other firmware (not shown). The various software and/or firmware modules have varying functionality when their corresponding program code is executed by processor(s) 102 or other processing devices within IHS 100.

IHS 100 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from or stored to corresponding removable storage device(s) 130, such as a compact disk (CD), digital video disk (DVD), flash drive, or flash memory card. In one or more embodiments, device interface(s) 128 can also provide an integration point for connecting other device(s) to IHS 100.

IHS 100 also comprises identifier generation and validation (IGV) controller 114 which further comprises IGV module 115. While shown as a component within IGV controller 114, it is appreciated that IGV module 115 can be and is later described as a firmware module. IGV controller 114 is electronically and/or communicatively coupled to a number of original equipment manufacturer (OEM) programmable devices 116 via device interface(s) 128. In one implementation, device interface(s) 128 can further include General Purpose I/O interfaces such as I²C, SMBus, and peripheral component interconnect (PCI) buses to support such connections to OEM programmable devices 116. OEM programmable devices 116 respectively comprise OEM field(s) 118. As described herein, IGV controller 114 is able to generate a unique identifier code for each of OEM programmable devices 116. Also, IGV controller 114 can also determine whether a specific target device is an OEM validated device. As utilized herein, an OEM validated device and/or an OEM-programmed device refers to a device or component that was selected for use within an end-user IHS and which is programmed with its own unique identifier by IGV controller 114 while within a secure manufacturing or OEM environment.

IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to server 140 via an external network, such as network 136. As illustrated, server 140 comprises central OEM database 145, whose functionality is later described. Network 136 can be a local area network, wide area network, personal area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
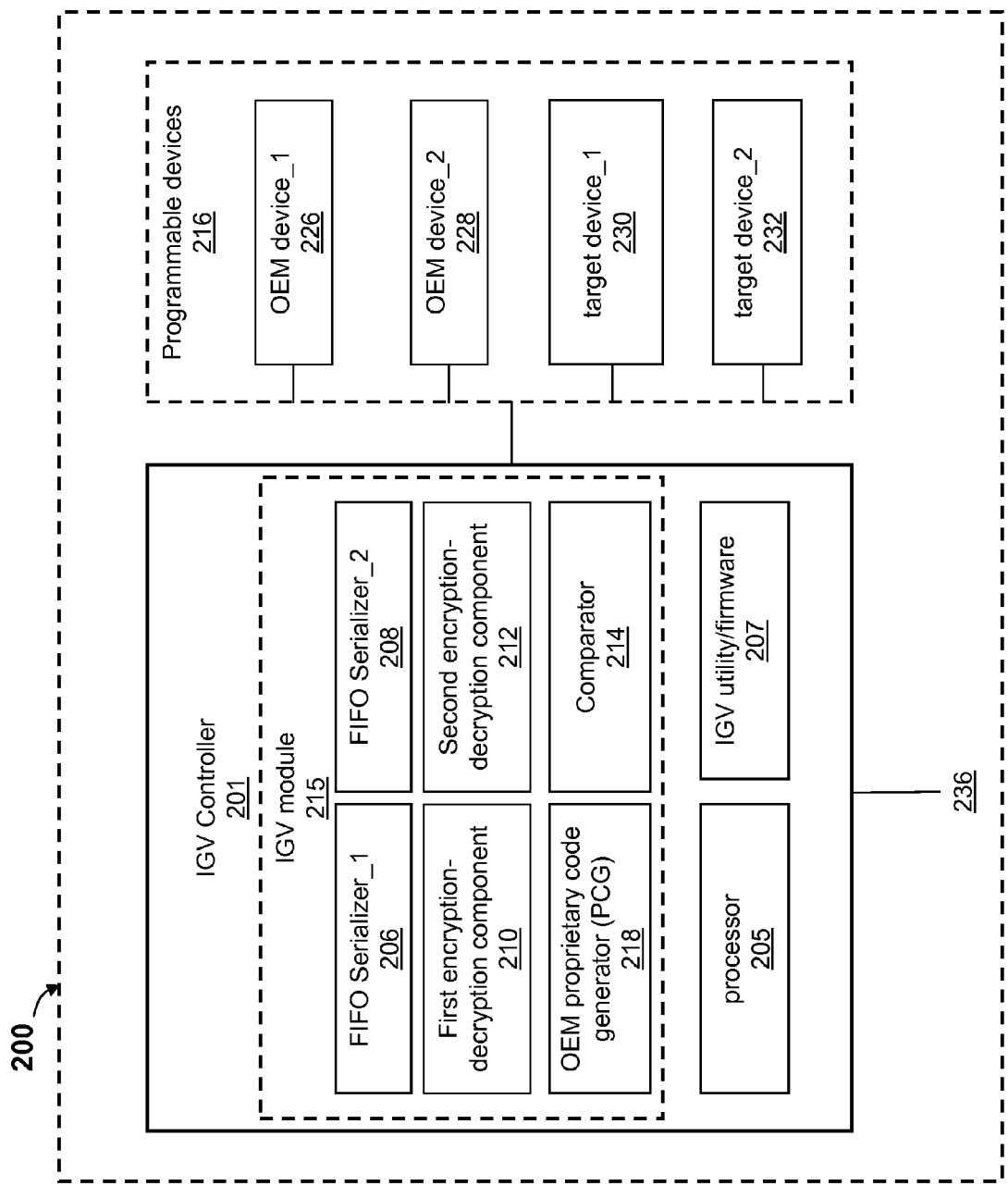
FIG. 2 illustrates another block diagram of the example IHS, and specifically a detailed view of the IGV controller's secure environment, in accordance with one or more embodiments.

Within the context of the unique identifier generation for programmable devices, IHS 100 can be an OEM or authorized manufacturer server operating within a secure environment and/or utilizing proprietary software. IHS 100 then performs the generation of the unique identifier for the various programmable components via one of an individualized (one-by-one) device processing for unique code generation and a serial, batch processing. For example, as shown in FIG. 2, described hereafter, multiple programmable devices can be serially connected to the IHS 100 and each provided a unique identifier based on the unique serial number assigned to the individual devices. The generated unique identifier codes can then be mapped in a database to the specific unique serial numbers of each programmable device.

IGV controller 114 enables an OEM to provide support for OEM Differentiated Memory capabilities to their customers. IGV controller 114 utilizes a unique OEM identifier code in order to: (1) detect, during target device validation, non-OEM installed memory or programmable devices and warn the user that the memory is not OEM supported; (2) detect, during target device validation, non-OEM installed memory and inform the user that OEM Advanced Memory Capabilities are disabled; (3) build statistics on OEM vs. Non-OEM memory installed in the field and/or at time of service for potential use in service and/or warranty actions, marketing or sales engagements; and (4) allow faster than industry standard DDR channel operation for numerous DIMM populations or modes.

The unique OEM identifier code may also be used to enable enhanced memory capabilities, including but not limited to: (1) rank margin test logging for enabling stretch goal operation; (2) memory measured and/or characterized power attributes for tuning power/performance and power management; (3) run-time telemetry and/or black box capture for enhanced failure analysis; (4) tracking a number of DIMM insertions/removals in a DIMM connector; (5) system-level data mining; (6) DIMM Enhanced Error Logging; and (7) advanced Reliability, Availability, and Serviceability (RAS) modes.

In general, in the DIMM implementation, IGV controller 114 generates a unique identifier code that is programmed into the OEM use area of OEM supported and validated server DIMMs or other programmable devices. The unique identifier code is generated utilizing an OEM "Secret" or proprietary code, the JEDEC DIMM supplier manufacturing date code field, and the JEDEC DIMM supplier Serial Number field, and a specially crafted and secret two-way (reversible) linear feedback shift register (LFSR) based scrambler and Exclusive-OR (XOR) scrambler. An alternative method for generating unique identifier codes involves use of Private/

Public key encryption. However, the limited amount of space available in the SPD EEPROM to store the identifier code (e.g., approximately 4 bytes only) or environments where programming and/or checking the identifier code cannot accommodate standard key interchange may cause the alternative methods to be less frequently utilized.

The OEM Identifier Code (and potentially other SPD OEM fields) is only programmable using OEM test software. The OEM test software is made available to manufacturing sites, memory suppliers, repair depots, and other applicable sites, and executes only when running on an authorized/OEM server. Further, the OEM test software only executes in a system operating within a manufacturing mode. In various embodiments, the code may be stand-alone, built into the BIOS, or a Unified Extensible Firmware Interface (UEFI), or the code may use some other deployment mechanism or platform.

According to one aspect of the disclosure, JEDEC DIMM SPD EEPROMs define an area for OEM Use. On DDR3, for example, this area is the top 80 (out of 256) bytes, i.e., bytes 176-255. On DDR4, this area is the top 128 (out of 512) bytes, i.e., bytes 384-511. In one embodiment, a four-byte field is used for the unique identifier code, but in other embodiments, a greater number of bytes or a lower number of bytes may be utilized as long as the number utilized is large enough to maintain acceptable code strength.

For DDR3, the Module ID: Module Manufacturing Date is provided in bytes 120-121 and the Module Serial Number is presented in bytes 122-125. For DDR4, the equivalent bytes are 232-324, and 325-328. The module manufacturer includes a date code for the module. The JEDEC definitions for bytes 120 and 121 are year and week respectively. These bytes must be represented in Binary Coded Decimal (BCD). For example, week 47 in year 2003 would be coded as 0x03 (0000 0011) in byte 120 and 0x47 (0100 0111) in byte 121. Generally, the supplier must include a unique serial number for the module. The supplier may use whatever decoding method desired in order to maintain a unique serial number for each module.

Within the context of the unique identifier verification process for installed devices or components, IHS 100 can be a single user device, such as a personal computer or a server that has been shipped out of the manufacturing environment, such that the IHS 100 can be modified in the field to include non-OEM approved/authorized devices. Within this context, IHS 100 includes at least one and potentially a plurality of components or devices that can be targeted for verification. In the described embodiments, these components or devices are referred to as target device/s. As shown by FIG. 2, described below, the single IHS can have a controller that performs the verification processes locally across all target devices communicatively coupled to or embedded on/within the circuit board, motherboard, and/or chassis of IHS 100. This operation may be completed serially across all target devices during a power on self test (POST), for example.

With specific reference now to FIG. 2, there is depicted another block diagram representation of an IHS, and specifically an exploded view of the IGV controller's identifier generation and/or validation environment 200 (referenced hereafter as IGV environment 200), which provides the functional aspects of the described embodiments. In one embodiment, IGV environment 200 represents an end-user IHS configuration environment in which both the IGV controller and the target programmable devices are included. The information handling system that provides the end-user IGV environment is interchangeably referred to herein as the second IHS to differentiate from the first IHS that performs the generation processes within a secure OEM/manufacturer's environment. IGV environment 200 comprises IGV controller 201 and programmable devices 216 to which IGV controller 201 is electronically and/or communicatively coupled. IGV controller 201 comprises processor 205 and IGV utility/firmware 207 which supports the identifier code generation and validation functions of IGV controller 201. When executed on processor 205, IGV utility/firmware 207 generates IGV module 215, which can be firmware that includes a plurality of functional components that can collectively enable the generation (during OEM generation processes and preliminary verification processes) and the verification processes, as described herein. As shown, IGV module 215 comprises First-In-First-Out (FIFO) serializer_1 206, FIFO serializer_2 208, first encryption-decryption component 210 and second encryption-decryption component 212. In addition, IGV module 215 comprises OEM proprietary code generator (PCG) 218 and comparator 214. Example programmable devices 216 comprise OEM device_1 226, OEM device_2 228, target device_1 230 and target device_2 232. These OEM/target devices 226-232 can include, as specific examples, without limitation, a dual in-line memory module (DIMM), a media drive, an Input/Output (I/O) card, a programmable fan, power supply unit (PSU), programmable media, a controller, or any programmable commodity in which there are some standard fields which may be read by IGV controller 201 to generate a unique code and which programmable commodity can provide storage for the unique code that is generated. These standard fields can include date codes, serial numbers, product ID/revision strings and manufacturing test data.

In one embodiment, IGV controller 201 and IGV module 215 are implemented as software and/or firmware components. However, in another embodiment, selected elements of IGV controller 201 and/or IGV module 215 are implemented using hardware elements.

Also illustrated in IGV environment 200 is Input/Output (I/O) port 236. When implemented within a secure and/or authorized manufacturing environment, IGV controller 201 executes on authorized IHS 100 during the manufacturing process and communicates with server IHS 140 (FIG. 1) via I/O port 236. In addition, IGV controller 201 provides to server IHS 140, via I/O port 236, information about a programmed state of a newly programmed OEM device. The provided information in turn triggers or causes an update to central OEM database 145 (FIG. 1).

In a first embodiment, as illustrated in FIG. 1, the IGV controller 114 executing within an IHS (e.g., IHS 100) is electronically coupled to the OEM devices via an external connection. The first embodiment is generally utilized during a manufacturing process and, in particular, for OEM identifier code generation and programming of OEM devices. However, in a second embodiment, the target programmable devices are installed within a same IHS (e.g., IHS, FIG. 2) in which the IGV controller executes. The second embodiment is generally utilized during a post-manufacturing process when a target device installed within an IHS is verified to determine whether an OEM validated unique identifier code is written to the target device. Thus, IGV controller 114 is generally described as being associated with the first embodiment, and IGV controller 201 is generally described as being associated with the second embodiment. However, for consistency in the descriptions which follow, IGV controller 114 and 214 are both described from the perspective of IGV controller 201 of FIG. 2.

Referring again to FIG. 2, IGV controller 114 executing within an authorized IHS reads first identification (ID) data from an OEM programmable device (e.g., OEM device_1 226) and generates an OEM proprietary code corresponding to the first ID data using PCG 218. IGV controller 114 generates a unique encrypted sequence by encrypting the first identification data read from the OEM programmable device using first (reversible) encryption-decryption component 210. IGV controller 114 generates a unique identifier code for the OEM programmable device by using second (reversible) encryption-decryption component 212 to perform encryption using (a) the OEM proprietary code and (b) the unique encrypted sequence. IGV controller 114 securely writes the unique identifier code to a pre-specified location (e.g., OEM field(s) 118 (FIG. 1)) of the OEM programmable device. In an example implementation in which the OEM programmable device is a DIMM, the pre-specified location occupies a specific number of bytes of a serial presence detect (SPD) OEM area of the DIMM. IGV controller 114 utilizes proprietary software which is executable within an OEM IHS during a pre-defined mode of operation (e.g., during a manufacturing mode).

IGV controller 201 is able to trigger particular functions of IGV module 215 for a specific order of execution in order to generate a unique identifier code and/or validate an identifier code read from an OEM programmable device. A specifically ordered execution of functions represents one of multiple functional configurations that can be configured by IGV controller 201.

In one embodiment, the first encryption-decryption component is a multiple stage encryption-decryption component that yields encrypted sequence outputs for multiple stages, respectively. IGV controller 114/201 utilizes the multiple stage encryption-decryption component to provide further security. The multiple stage encryption-decryption component provides storage for the encrypted sequence outputs for the multiple stages using a corresponding number of fields that is greater than a number of fields utilized for a single stage encryption-decryption component.

IGV controller 114/201 provides additional security in the encryption/decryption processes by encrypting a source code for at least one of (a) the OEM/manufacturer proprietary code and (b) the coefficients utilized within the first reversible encryption-decryption component or LFSR to prevent access to proprietary code and coefficients by a third party. Furthermore, IGV controller 114/201 periodically updates at least one of (a) the manufacturer proprietary code and (b) the coefficients utilized within the first reversible encryption-decryption component to provide enhanced security. IGV controller 114/201 provides this enhanced security to respectively increase a difficulty in reverse engineering from information read from the OEM programmable device the manufacturer proprietary code and the coefficients utilized within the first reversible encryption-decryption component.

Figure 3:
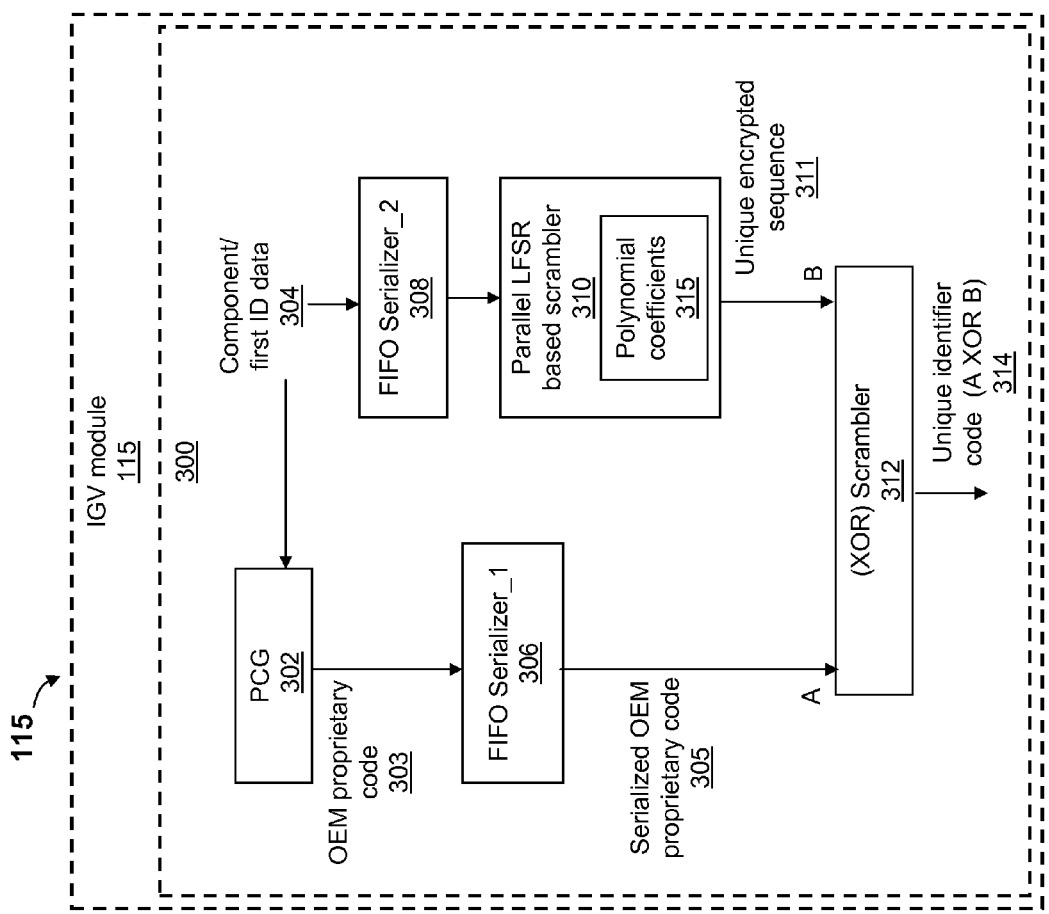
FIG. 3 is a block diagram illustrating a first functional configuration of IGV module 115 for unique identifier generation within an information handling system (IHS), according to one embodiment.

FIG. 3 is a block diagram illustrating a first functional configuration of IGV module 115 for unique identifier generation within an information handling system (IHS), according to one embodiment. IGV utility/firmware 224 of IGV controller 114 configures IGV module 115 to provide configuration 300. Configuration 300 comprises PCG 302 which generates OEM proprietary code 303. Configuration 300 also comprises FIFO serializer_1 306 and FIFO serializer_2 308 which respectively receive OEM proprietary code 303 and component/first ID data 304. Configuration 300 also comprises a first encryption-decryption component implemented as reversible, parallel linear feedback shift register (LFSR) based scrambler 310 which is coupled to an output port of FIFO serializer_2 308. Illustrated within parallel LFSR based scrambler 310 are polynomial coefficients 315 which IGV controller 114 generates. IGV controller 114 generates unique encrypted sequence 311 using parallel LFSR based scrambler 310. In addition, configuration 300 comprises a second encryption-decryption component implemented using an Exclusive-OR (XOR) scrambler (engine) 312 which is coupled via a first input port to an output port of FIFO serializer_1 306. XOR scrambler 312 is coupled via a second input port to an output port of parallel LFSR encryption-decryption component 310. XOR scrambler 312 receives serialized OEM proprietary code 305 at the first input port and unique encrypted sequence 311 at the second input port. During operation, configuration 300 and specifically XOR scrambler 312 yields unique identifier code 314.

In a first example implementation, code "A" representing serialized OEM proprietary code 305 is received at the first input port of XOR scrambler 312. In addition, code "B" representing unique encrypted sequence 311 is received at the second input port of XOR scrambler 312. As a result, XOR scrambler 312 yields "A" XOR "B" as unique identifier code 314.

When IGV module 115 is implemented as configuration 300, IGV controller 114 generates a unique encrypted sequence by using a reversible parallel LFSR based scrambler (310), which utilizes a proprietary set of polynomial coefficients. Furthermore, IGV controller 114 generates the first unique OEM identifier code for the OEM programmable device using a second reversible encryption-decryption component that comprises an Exclusive-OR (XOR) scrambler (312). IGV controller 114 writes unique OEM identifier code 314 to a pre-identified location of and OEM programmable device (216). In one implementation, the pre-identified location occupies a specified number of bytes of a serial presence detect (SPD) OEM use area of an OEM programmable device.

Figure 4:
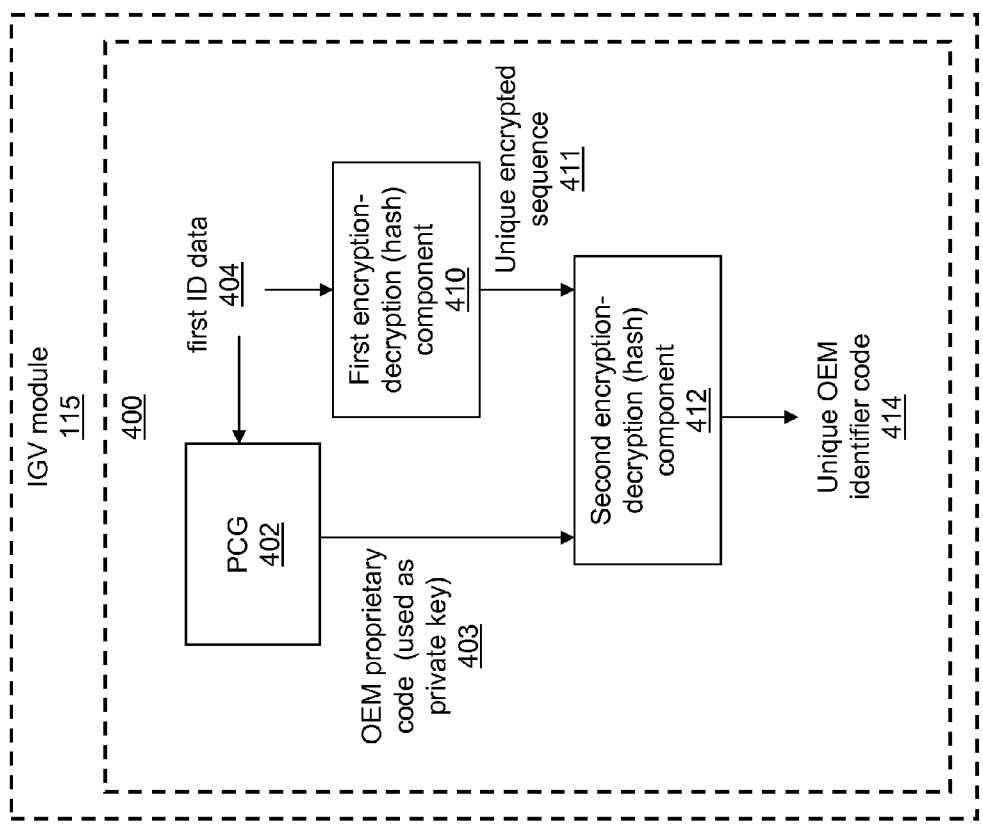
FIG. 4 is a block diagram illustrating a second functional configuration of IGV module 115 for unique identifier generation within an information handling system (IHS), according to one embodiment.

FIG. 4 is a block diagram illustrating a second functional configuration of IGV module 215 for unique identifier generation within an information handling system (IHS), according to one embodiment. IGV utility/firmware 207 of IGV controller 201 configures IGV module 215 to provide second unique identifier generation (UIG) configuration 400. Second UIG configuration 400 comprises first encryption-decryption component 410 which receives component or first ID data 404. As illustrated, first encryption-decryption component 410 is a cryptographic hash function standard (e.g. SHA-1, SHA-2). Second UIG configuration 400 also comprises PCG 402 which generates OEM proprietary code 403. In addition, second generation configuration 400 comprises second encryption-decryption component 412 which receives OEM proprietary code 403 at a first input port. As illustrated, second encryption-decryption component 412 utilizes OEM proprietary code 403 as a private key to encrypt a hash generated by first encryption-decryption component 410. Second encryption-decryption component 412 is coupled via a second input port to an output port of first encryption-decryption component 410. In addition, second encryption-decryption component 412 yields unique OEM identifier code 414.

In second UIG configuration 400, IGV controller 201 generates a hash which represents unique encrypted sequence 411. IGV controller 201 generates a unique OEM identifier code 414 for an OEM programmable device providing first ID data 404 by encrypting unique encrypted sequence 411 (i.e., the generated hash) using OEM proprietary code 403 as a private key.

Referring again to FIG. 2 and particularly from the context of verification of the unique code, IGV controller 201 performs a validation check on a target programmable device to determine whether the target programmable device is an OEM validated device. In particular, IGV controller 201 reads from the target programmable device (a) second ID data and (b) a second identifier code. IGV controller 201 generates a unique encrypted sequence corresponding to the second ID data. In addition, IGV controller 201 generates a component validation code corresponding to the target programmable device by using the second reversible encryption-decryption component which provides a first decryption process that reverses a first encryption process (provided by IGV controller 114) that can be utilized to generate a unique identifier code for an OEM programmable device having a same ID data as the second ID data. IGV controller 201 performs the first decryption using (a) the identifier code read from the target programmable device and (b) the unique encrypted sequence corresponding to the second ID data. In addition, IGV controller 201 compares the component validation code to the manufacturer proprietary code or a validation check code corresponding to the second ID data to determine whether the identifier code read from the target programmable device is a valid identifier code.

According to one aspect of the disclosure, in response to the component validation code not being identical to the manufacturer proprietary code, IGV controller 201 identifies the target programmable device as an invalid component having an invalid identifier code. However, in response to the component validation code being identical to the manufacturer proprietary code, IGV controller 201 identifies the target programmable device as a programmed device having a valid identifier code.

In one embodiment, in response to identifying the target programmable device as a programmed device having a valid identifier code, IGV controller 214 determines whether a serial number of the target device is unique by comparing the ID data against information provided within an OEM central database. In response to the serial number being unique, IGV controller 214 identifies the target device as an OEM programmed device with a valid OEM-provided unique identifier code stored as the retrieved identifier code. However, in response to the serial number not being unique, IGV controller 201 issues a notification of a serial number conflict.

According to another aspect of the disclosure, in response to the target programmable device being identified as a valid OEM programmed device and pre-identified capabilities involving use of the target programmable device being disabled pending an outcome of a validation check, IGV controller 201 enables the pre-identified capabilities. However, in response to the target programmable device being identified as an invalid component and the pre-identified capabilities being disabled pending an outcome of a validation check, IGV controller 201 maintains a disabled state of the pre-identified capabilities.

Figure 5:
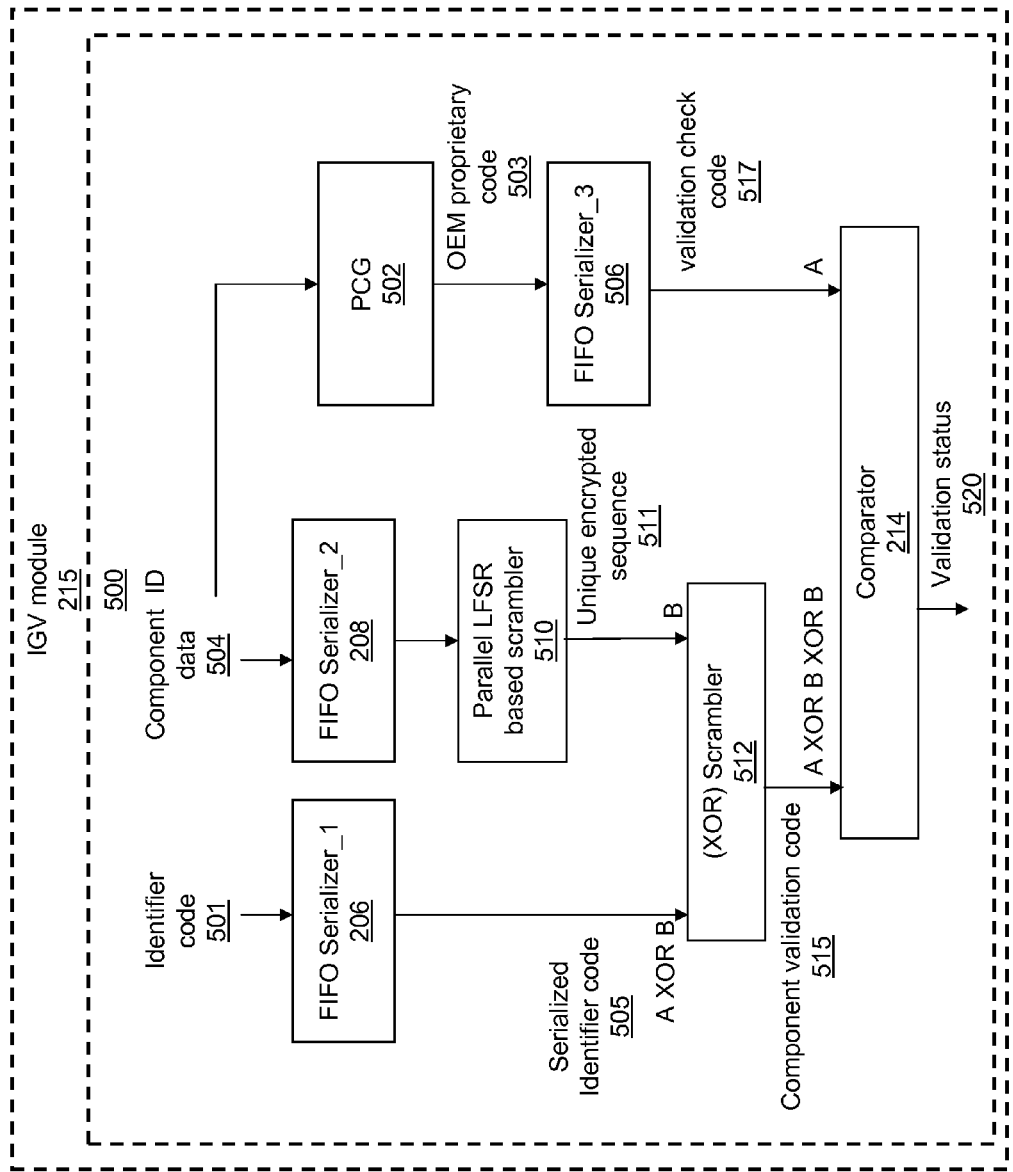
FIG. 5 is a block diagram illustrating a first functional configuration of IGV module 215 for identifier code validation within an information handling system (IHS), according to one embodiment.

FIG. 5 is a block diagram illustrating a first functional configuration of IGV module 215 for identifier code validation within an information handling system (IHS), according to one embodiment. IGV utility/firmware 207 of IGV module 215 configures IGV module 215 to provide first unique identifier verification (UIV) configuration 500. First UIV configuration 500 comprises FIFO serializer_1 206 and FIFO serializer_2 208 which respectively receive (a) identifier code 501 which is read from a target programmable device and (b) component ID data 504. First UIV configuration 500 also comprises a first encryption-decryption component implemented using reversible, parallel linear feedback shift register (LFSR) based scrambler 510 which is coupled to an output port of FIFO serializer_2 208. Parallel LFSR based scrambler 510 includes polynomial coefficients (not shown) which IGV module 215 generates. IGV module 215 generates unique encrypted sequence 511 using parallel LFSR based scrambler 510. In addition, first UIV configuration 500 comprises a second encryption-decryption component implemented using an Exclusive-OR (XOR) scrambler 512 which is coupled via a first input port to an output port of FIFO serializer_1 206. XOR scrambler 512 is coupled via a second input port to an output port of parallel LFSR 510, which is an encryption-decryption component. XOR scrambler 512 receives serialized identifier code 505 at the first input port and unique encrypted sequence 511 at the second input port. IGV module 215 generates component validation code 515 using XOR scrambler 512. First UIV configuration 500 also includes PCG 502 which generates OEM proprietary code 503. First UIV configuration 500 also comprises FIFO serializer_3 506 which receives OEM proprietary code 503 from PCG 502 and yields validation check code 517 which is a serialized OEM proprietary code corresponding to OEM proprietary code 503. In addition, first UIV configuration 500 comprises comparator 214. Comparator 214 receives (a) component validation code 515 via a first input port and (b) validation check code 517 via a second input port. Comparator 214 yields validation status 520.

Following system start-up or a power on procedure (or during a power on self test POST) process, IGV module 215 initiates a validation check of a target programmable device to determine whether the target programmable device includes a valid unique identifier code. The target programmable device yields component/second ID data 504. In one embodiment, IGV module 215 generates unique encrypted sequence 511 corresponding to second component ID data 504 by serializing second component ID data 504 using FIFO serializer_2 208 and encrypting the serialized second component ID data 504 using parallel LFSR based scrambler 510. In one implementation, component or second ID data 504 includes (a) a date of manufacture and (b) a serial number of the target programmable device. IGV module 215 concatenates the date of manufacture and the serial number of the target programmable device to provide second component ID data 504 and serializes second component ID data 504 using FIFO Serializer_2 208. IGV module 215 is able to generate unique encrypted sequence 511 by encrypting the serialized second component ID data. Using first UIV configuration 500 of IGV module 215, IGV controller 201 generates component validation code 515 corresponding to the target programmable device by using the second reversible encryption-decryption component (e.g., XOR scrambler 512) to perform encryption using (a) an identifier code read from the target programmable device and (b) the unique encrypted sequence.

IGV module 215 then compares component validation code 515 to validation check code 517 (i.e., the serialized OEM proprietary code corresponding to second component ID data 504) to determine whether identifier code 502 read from the target programmable device is a valid and unique OEM identifier code. In response to component validation code 515 not being identical to validation check code 517, IGV module 215 identifies the target programmable device as an invalid component having an invalid identifier code by setting validation status 520 to "FAIL" or "INVALID". However, in response to component validation code 515 being identical to validation check code 517, IGV module 215 identifies the target programmable device as a valid component having a valid identifier code by setting validation status 520 to "PASS" or "VALID". In one embodiment, as described in FIG. 2, IGV module 215 determines whether the serial number included within the ID data read from the target programmable device is unique before determining whether the target programmable device is a valid component having a valid and unique identifier code.

In response to the target programmable device being identified as a valid component and pre-identified advanced capabilities involving use of the target programmable device being disabled during normal operation, IGV module 215 enables the pre-identified advanced capabilities during normal operation. However, in response to the target programmable device being identified as an invalid component and the pre-identified advanced capabilities being disabled during normal operation, IGV module 215 maintains a disabled state of the pre-identified advanced capabilities.

In a second example implementation associated with the first example implementation of FIG. 3, if first ID data 304 (FIG. 3) matches second ID data 504, code "A XOR B" representing serialized identifier code 505 is received at the first input port of XOR scrambler 512. In addition, code "B" representing unique encrypted sequence 511 is received at the second input port of XOR scrambler 512. As a result, XOR scrambler 512 yields "A XOR B XOR B" representing component validation code 515 which is received at a first input port of comparator 214. In addition, code "A" representing validation check code 517 is received at a second input port of comparator 214. A XOR B XOR B is equal to A. As a result, in the second example implementation, IGV module 215 sets validation status 520 to "PASS" confirming that the target programmable device is an OEM-validated device having a valid and unique OEM identifier code.

IGV module 215 performs additional compatibility checks on the target programmable device including comparing retrieved content within data fields from the target programmable device against stored content within corresponding fields on a platform Approved Vendor List (AVL), including one or more of: (a) a module manufacturer identifier code; (b) a module revision code; and (c) other associated revision codes. IGV module 215 can use a result of the additional compatibility checks to determine whether the target programmable device is an OEM programmed device.

Figure 6:
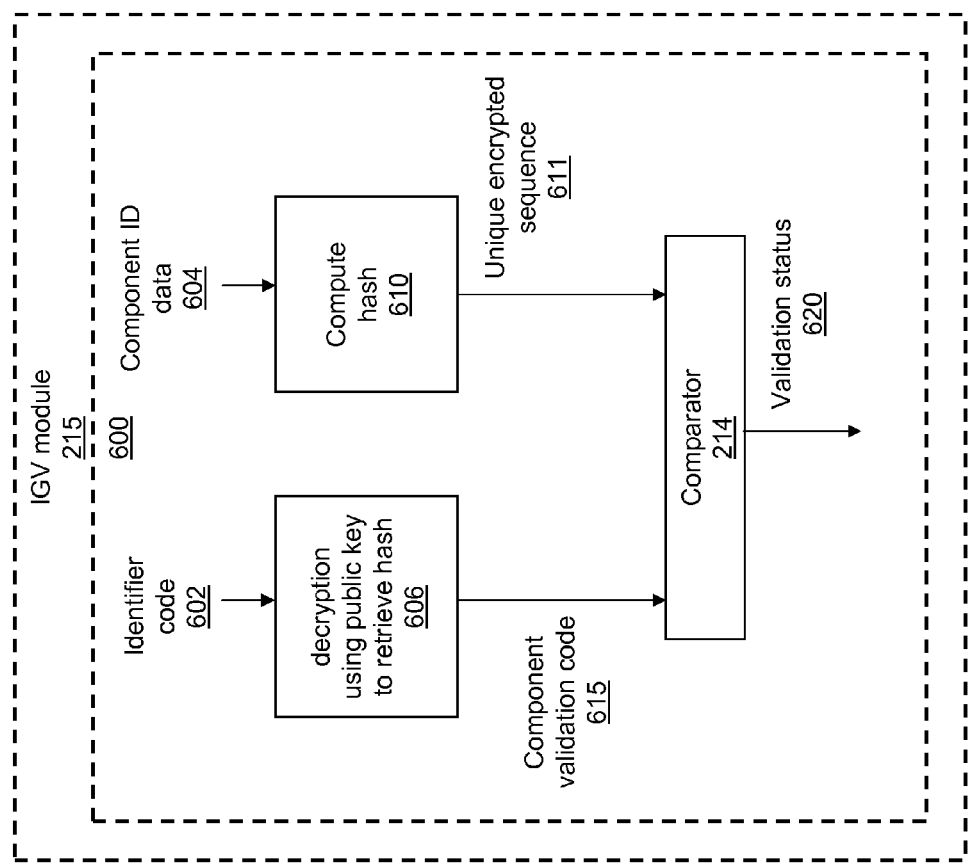
FIG. 6 is a block diagram illustrating a second functional configuration of IGV module 215 for identifier code validation within an information handling system (IHS), according to one embodiment.

FIG. 6 is a block diagram illustrating a second functional configuration of IGV module 215 for identifier code validation within an information handling system (IHS), according to one embodiment. IGV utility/firmware 207 executes on IGV controller 214 to generate IGV module 215, which provides second UIV configuration 600. Second UIV configuration 600 comprises decryption component 606 and hash encryption-decryption component 610 which respectively receive identifier code 602 and component or second ID data 604. Decryption component 606 yields component validation code 615 which is a decrypted hash value. Hash encryption-decryption component 610 yields unique encrypted sequence 611 which is a hash of the second ID data 604. Configuration 600 also comprises comparator 214 respectively coupled to output ports of decryption component 606 and Hash encryption-decryption component 610. Comparator 214 yields validation status 620.

IGV controller 214 configures IGV module 215 to provide second UIV configuration 600 by which IGV controller 214 decrypts, using a public encryption key stored within a BIOS of an IHS, an identifier code read from a target programmable device. In particular, if component or second ID data 604 matches first ID data 404, IGV controller 214 performs a decryption process that reverses an encryption process performed on unique encrypted sequence 511 (i.e., the generated hash) and which encryption process was provided by second encryption-decryption component 412 (FIG. 4). IGV controller 214 compares component validation code 615 (i.e., the decrypted identifier code) to unique encrypted sequence 611 to determine if the identifier code read from the target programmable device is a valid identifier code. In response to component validation code 615 not being identical to unique encrypted sequence 611, IGV controller 214 sets validation status 620 to "FAIL" or "INVALID" identifying the target programmable device as an invalid device having an invalid identifier code. However, in response to component validation code 615 being identical to unique encrypted sequence 611, IGV controller 214 sets validation status 620 to "PASS" or "VALID" identifying the target programmable device as a validated device having a valid identifier code. In one embodiment, as described in FIG. 2, IGV controller 214 determines whether the serial number included within the ID data read from the target programmable device is unique before determining whether the target programmable device is a valid component having a valid and unique identifier code.

Those of ordinary skill in the art will appreciate that the hardware, firmware/software utility, and software components and basic configuration thereof depicted in FIGS. 1-6 may vary. The illustrative components of IHS 100/200 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIGS. 7-10 present flowcharts illustrating example methods by which IHS 100 and/or IGV environment 200 and specifically IGV controller 114/201 presented within the preceding figures performs different aspects of the processes that enable one or more embodiments of the disclosure. Generally, method 700, method 800, method 900 and method 1000 collectively represent methods for generating unique identifier codes and for validating identifier codes for programmable devices. The description of each method is provided with general reference to the specific components illustrated within the preceding figures. Generally each method is described as being implemented via execution of IGV utility/firmware 207 within IGV controller 114/201. It is, however, appreciated that certain aspects of the described methods may be implemented via other processing devices and/or execution of other code. In the discussion of FIGS. 7-10, reference is also made to elements described in FIG. 1-FIG. 6.

Figure 7:
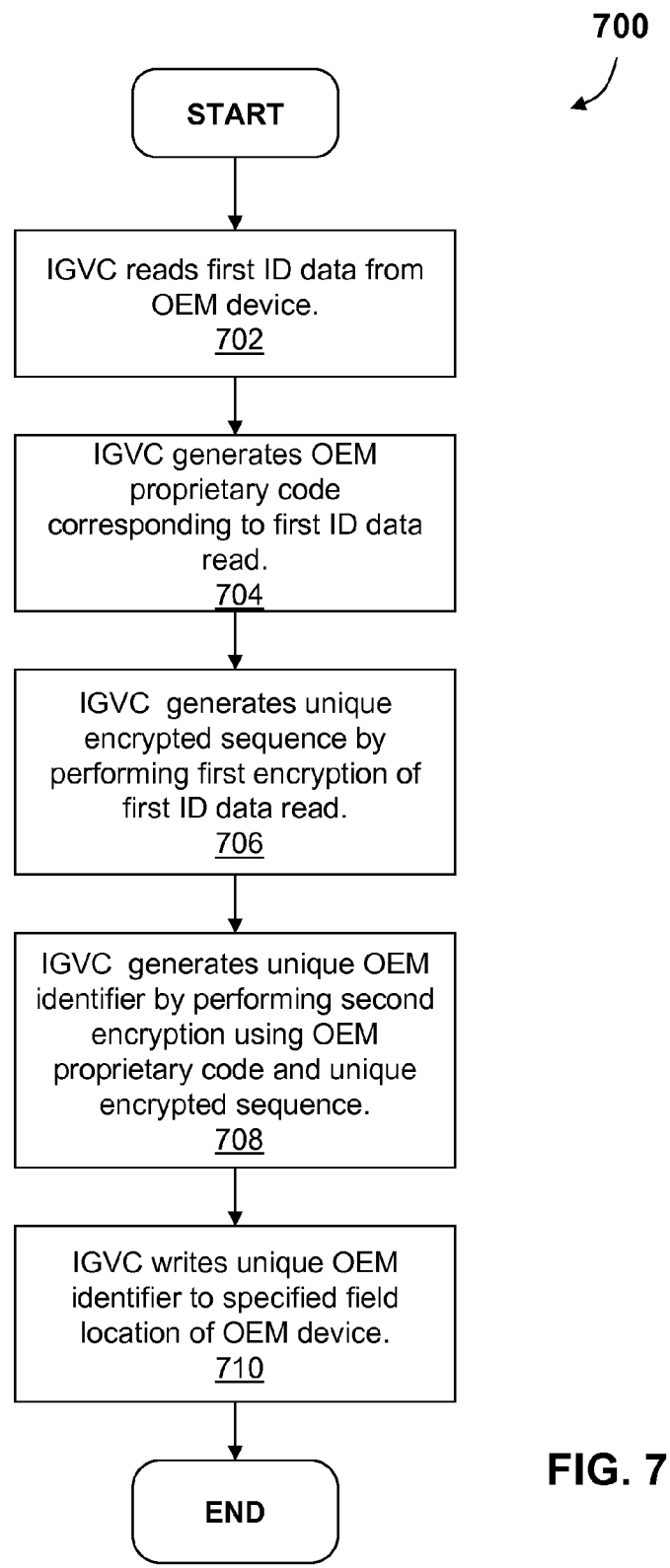
FIG. 7 is a flow chart illustrating a first example method for generating unique identifier codes for an OEM programmable device, in accordance with one or more embodiments.

FIG. 7 illustrates a first example method within IHS 100 and/or IGV environment 200 for generating unique identifier codes for an OEM programmable device. Method 700 begins at the start block and proceeds to block 702 where IGV controller (IGVC) 114 reads first ID data from a programmable OEM device/component that will be installed within an information handling system (IHS). IGVC 114 generates an OEM proprietary code corresponding to the first ID data read (block 704). IGVC 114 generates a unique encrypted sequence by performing a first encryption process (by using first encryption-decryption component 210) to encrypt the first ID data read (block 706). IGVC 114 generates a unique OEM identifier code by using second encryption-decryption component 212 to perform a second encryption process using OEM proprietary code 303 and unique encrypted sequence 311 (block 708). IGVC 114 writes the unique OEM identifier code 314 to a specified field location of OEM device (block 710). The process ends at end block.

Figure 8:
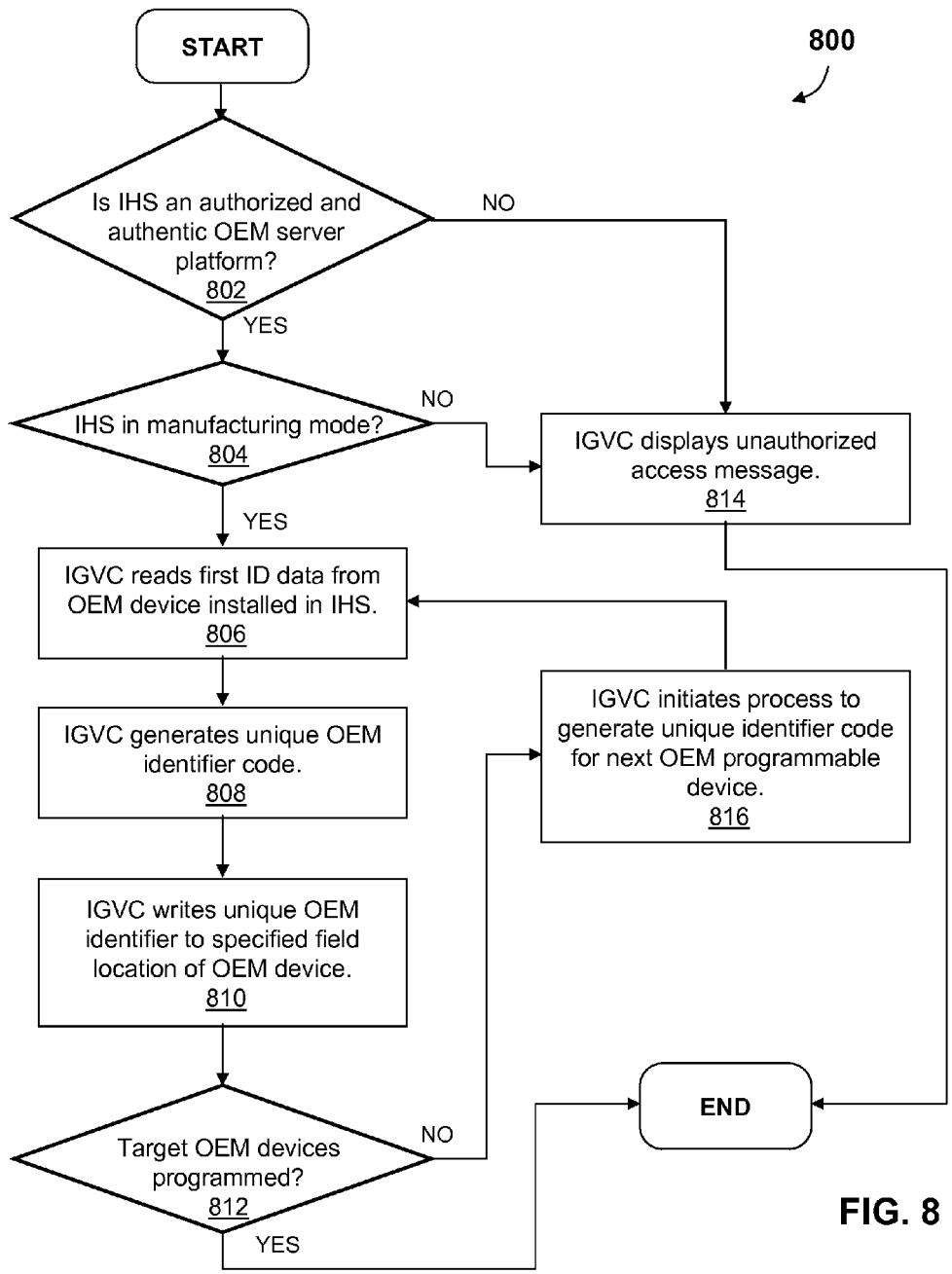
FIG. 8 is a flow chart illustrating a second example method for generating unique identifier codes for OEM programmable devices within IHS 100, in accordance with one or more embodiments.

FIG. 8 illustrates a first example method within IHS 100 and/or IGV environment 200 for generating unique identifier codes for OEM programmable devices. Method 800 begins at the start block and proceeds to decision block 802 where IGV controller 114 determines whether IHS 100 can be identified as an authorized and authentic OEM server platform. If IHS 100 is not an authorized and authentic OEM server platform, IGVC 114 displays a message indicating that access to execute software components such as IGV firmware 207 is not authorized (block 814). However, if IHS 100 is an authorized and authentic OEM server platform, IGVC 114 determines whether IHS 100 is operating within a specified manufacturing mode (decision block 804). In one embodiment, in response to initiation within IHS 100 of software and/or firmware execution for generating and/or validating (unique) identifier codes within IHS 100, IGVC 114 determines whether IHS 100 is an authorized server platform operating within the specified manufacturing mode before permitting software and/or firmware execution. If IGVC 114 determines that IHS 100 is not operating within the specified manufacturing mode, IGVC 114 displays the message indicating that access to execute software components such as IGV firmware 207 is not authorized (block 814). However, if IGVC 114 determines that IHS 100 is operating within the specified manufacturing mode, IGVC 114 reads the first ID data from the OEM device electronically coupled to IGVC 114 (block 806).

IGVC 114 generates a unique OEM identifier code for the OEM device as described in FIG. 3 or FIG. 5 (block 808). IGVC 114 writes the unique OEM identifier code to a specified field location of the OEM device (block 810). For example, if the OEM device is a DIMM, IGVC 114 writes the unique OEM identifier code to an SPD OEM use area location of the DIMM.

IGVC 114 determines whether the identified, target OEM devices have been programmed with unique identifier codes (decision block 812). If IGVC 114 has not already programmed the target OEM devices with unique identifier codes, IGVC 114 initiates process to generate a unique identifier code for a next OEM programmable device (block 816). Method then returns to block 806. However, if IGVC 114 has already programmed the identified OEM devices with unique identifier codes, the process by which IGVC 114 generates and writes unique identifier codes terminates at end block.

Figure 9:
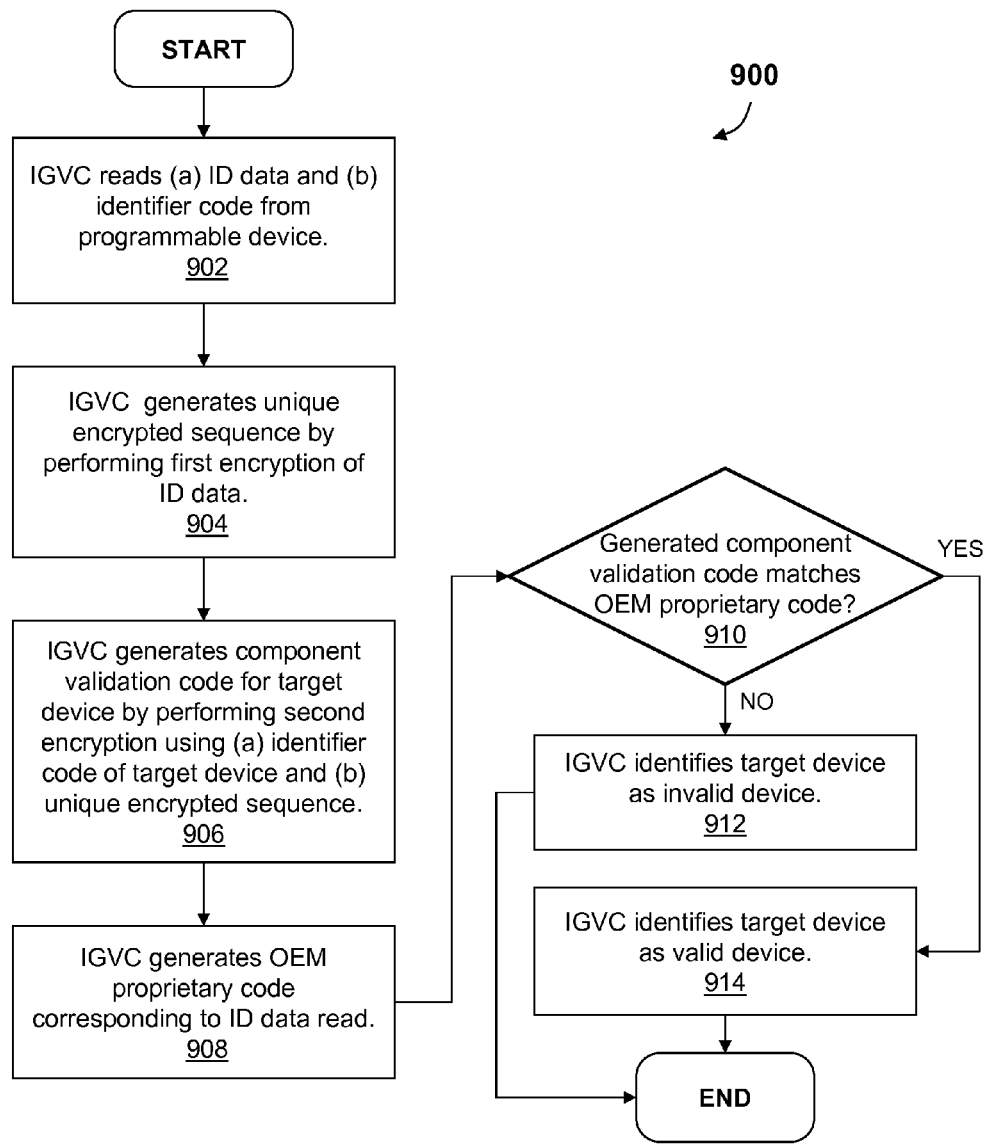
FIG. 9 is a flow chart illustrating a first example method for validating identifier codes for programmable devices installed within IHS 200, in accordance with one or more embodiments.

FIG. 9 illustrates a first example method within IHS 100 and/or IGV environment 200 for validating identifier codes for programmable components of IHS 100. Method 900 begins at the start block and proceeds to block 902 where IGV controller (IGVC) 214 reads (a) ID data and (b) an identifier code from a programmable target device/component installed within IHS 100. IGVC 214 generates a unique encrypted sequence by using first encryption-decryption component 210 to perform a first encryption process on the ID data read (block 904).

IGVC 214 generates a component validation code for the target device by using second encryption-decryption component 212 to perform a second encryption using (a) an identifier code read from the target device and (b) the unique encrypted sequence corresponding to the ID data (block 906). IGVC 214 generates an OEM/manufacturer proprietary code corresponding to the ID data read from the target device (block 908). IGVC 214 determines whether the generated component validation code matches the OEM proprietary code (decision block 910). If IGVC 214 determines that the generated component validation code does not match the OEM proprietary code, IGVC 214 identifies the target device as an invalid device (block 912). If IGVC 214 determines that the generated component code matches the OEM proprietary code, IGVC 214 identifies the target device as an OEM-validated device (block 914). The process ends at end block.

Figure 10:
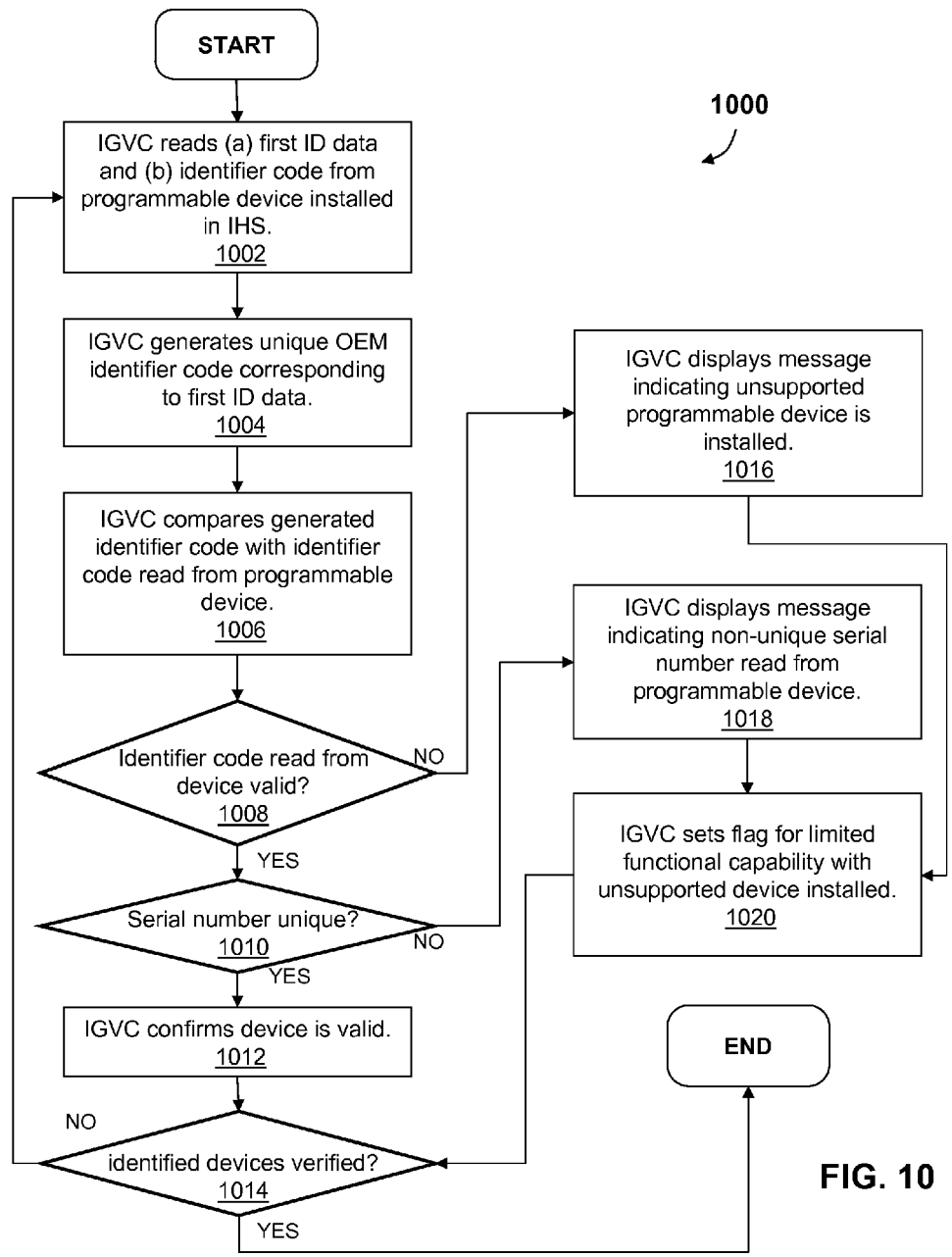
FIG. 10 illustrates a second example method for validating identifier codes for programmable components installed within IHS 200, in accordance with one or more embodiments.

FIG. 10 illustrates a second example method within IHS 100 and/or IGV environment 200 for validating identifier codes for programmable components installed within IHS 100. Method 1000 describes a validation process based on FIG. 5 or FIG. 6. Method 1000 begins at the start block and proceeds to block 1002 where IGV controller 214 reads (a) first ID data and (b) an identifier code from a target programmable device installed within IHS 100. IGVC 214 generates unique OEM identifier code corresponding to the first ID data (block 1004). IGVC 214 compares the generated identifier code with the identifier code read from the target programmable device (block 1006). IGVC 214 determines whether the identifier code read from the target programmable device matches the generated identifier code and, as a result, can be identified as a valid OEM identifier code (decision block 1008). If IGVC 214 determines that the identifier code read from the target programmable device is not a valid OEM identifier code, IGVC 214 displays a message indicating that an unsupported programmable device is installed (block 1016). However, if IGVC 214 determines that the identifier code read from the target programmable device is a valid OEM identifier code, IGVC 214 determines whether the serial number read from the target programmable device is a unique serial number which does not match any other serial number identified in an OEM central database (decision block 1010). If IGVC 214 determines that the serial number read from the target programmable device is not a unique serial number, IGVC 214 displays a message indicating that a non-unique serial number was read from the target programmable device having a valid OEM identifier code (block 1018). If IGVC 214 determines that the identifier code is invalid or the serial number is not unique, IGVC 214 sets a flag or validation status that enables only a limited functional capability while an unsupported device is installed (block 1020). However, if IGVC 214 determines that the serial number read from the target programmable device is a unique serial number, IGVC 214 confirms that the target programmable device is an OEM-validation device (block 1012). IGVC 214 determines whether identifier codes for the identified target programmable devices have been verified (decision block 1014). If the identifier codes for all the identified target programmable devices have not been verified, IGVC 214 continues to validate an identifier code for a next target programmable device by reading first ID data and a corresponding identifier code (block 1002). However, if the identifier codes for all the identified target programmable devices have been verified, the process for validating an identifier code for an identified target programmable devices installed within IHS 200 terminates (end block).

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for securely generating a unique original equipment manufacturer (OEM) identifier code for an OEM programmable device, the method comprising:
   generating, by an OEM authorized secure information handling system (IHS), a unique encrypted sequence by performing a first encryption on identification (ID) data read from the OEM programmable device, wherein the generating the unique encrypted sequence comprises generating the unique encrypted sequence using a first reversible encryption-decryption component that comprises an LFSR based scrambler, which utilizes polynomial coefficients that are securely generated and maintained;
   generating an OEM proprietary code;
   generating a unique OEM identifier code for the OEM programmable device by performing a second encryption on the unique encrypted sequence using the OEM proprietary code, wherein the generating a unique OEM identifier code for the OEM programmable device comprises generating the unique OEM identifier code using a second reversible encryption-decryption component that comprises an Exclusive-OR (XOR) scrambler engine;
   writing the unique OEM identifier code to a pre-specified storage location of the OEM programmable device;
   encrypting source code for at least one of (a) the OEM proprietary code and (b) the polynomial coefficients utilized within the first reversible encryption-decryption component to prevent third party access to the proprietary code and polynomial coefficients; and
   periodically updating at least one of (a) the OEM proprietary code and (b) the polynomial coefficients utilized within the first reversible encryption-decryption component to provide enhanced security.

2. The method of claim 1, wherein:
   the first encryption-decryption component is a multiple stage encryption-decryption component that yields encrypted sequence outputs for multiple stages, respectively, and which provides storage for the encrypted sequence outputs for the multiple stages using a corresponding number of fields that is greater than a number of fields utilized for a single stage encryption-decryption component.

3. The method of claim 1, wherein generating the unique encrypted sequence further comprises:
concatenating ID data elements read from the OEM programmable device to provide the ID data, wherein said ID elements include (a) a manufactured date and (b) a serial number of the OEM programmable device;
serializing the ID data; and
encrypting the serialized ID data to generate the unique encrypted sequence.

4. The method of claim 1, wherein:
generating the unique encrypted sequence comprises generating a hash of the ID data using a cryptographic hash function, wherein the generated hash is the unique encrypted sequence; and
generating a unique OEM identifier code for a specific OEM programmable device comprises performing an encryption process using the generated OEM proprietary code as a private key for encrypting the generated hash.

5. The method of claim 1, wherein the OEM programmable device is a dual in-line memory module (DIMM) that is electronically coupled to the OEM-authorized secure IHS, and the pre-identified location includes a specified number of bytes of a serial presence detect (SPD) OEM area of the DIMM.

6. The method of claim 1, wherein:
the OEM authorized secure IHS is a first IHS and the OEM programmable device is installed within a second target IHS.

7. An information handling system (IHS) comprising:
at least one processor;
a first encryption-decryption component;
a second encryption-decryption component;
a proprietary code generator (PCG); and
an identifier generation and validation (IGV) controller electronically coupled to at least one original equipment manufacturer (OEM) programmable device and which:
generates a unique encrypted sequence by performing a first encryption on identification (ID) data read from the OEM programmable device, wherein the IGV controller generates the unique encrypted sequence using a first reversible encryption-decryption component that comprises an LFSR based scrambler, which utilizes polynomial coefficients that are securely generated and maintained;
generates an OEM proprietary code;
generates a unique OEM identifier code for the OEM programmable device by performing a second encryption on the unique encrypted sequence using the OEM proprietary code, wherein the IGV controller generates the unique OEM identifier code using a second reversible encryption-decryption component that comprises an Exclusive-OR (XOR) scrambler engine; and
writes the unique OEM identifier code to a pre-specified storage location of the OEM programmable device;
encrypt source code for at least one of (a) the OEM proprietary code generator and (b) the polynomial coefficients utilized within the first reversible encryption-decryption component to prevent third party access to OEM proprietary code and polynomial coefficients; and
periodically updates at least one of (a) the OEM proprietary code and (b) the polynomial coefficients utilized within the first reversible encryption-decryption component to provide enhanced security.

8. The IHS of claim 7, wherein:
the first encryption-decryption component is a multiple stage encryption-decryption component that yields encrypted sequence outputs for multiple stages, respectively, and which provides storage for the encrypted sequence outputs for the multiple stages using a corresponding number of fields that is greater than a number of fields utilized for a single stage encryption-decryption component.

9. The IHS of claim 7, wherein the IGV controller generates the unique encrypted sequence by:
concatenating ID data elements read from the OEM programmable device to provide the ID data, wherein said ID elements include (a) a manufactured date and (b) a serial number of the OEM programmable device;
serializing the ID data; and
encrypting the serialized ID data to generate the unique encrypted sequence.

10. The IHS of claim 7, wherein the IGV controller:
generates the unique encrypted sequence comprises generating a hash of the ID data using a cryptographic hash function, wherein the generated hash is the unique encrypted sequence; and
generates a unique OEM identifier code for a specific OEM programmable device comprises performing an encryption process using the generated OEM proprietary code as a private key for encrypting the generated hash.

11. The IHS of claim 7, wherein the OEM programmable device is a dual in-line memory module (DIMM) that is electronically coupled to the OEM-authorized secure IHS, and the pre-identified location includes a specified number of bytes of a serial presence detect (SPD) OEM area of the DIMM.

12. The IHS of claim 7, wherein:
the OEM authorized secure IHS is a first IHS and the OEM programmable device is installed within a second target IHS.

* * * * *